US011364866B2

(12) United States Patent
Baldinger et al.

(10) Patent No.: US 11,364,866 B2
(45) Date of Patent: Jun. 21, 2022

(54) DETECTION OF A COLLISION OF A HANDLING DEVICE WITH AN OBSTACLE (71) Applicant: BLUE DANUBE ROBOTICS GMBH, Vienna (AT)

(72) Inventors: Andreas Baldinger, Vienna (AT); Tobias Ferner, Vienna (AT); Walter Wohlkinger, Vienna (AT); Michael Zillich, Vienna (AT)

(73) Assignee: BLUE DANUBE ROBOTICS GMBH, Vienna (AT)

( * ) Notice: Subject to any disclaimer, the term of this patent is extended or adjusted under 35 U.S.C. 154(b) by 349 days.

(21) Appl. No.: 16/606,819

(22) PCT Filed: Apr. 24, 2018

(86) PCT No.: PCT/AT2018/000031
§ 371 (c)(1),
(2) Date: Oct. 21, 2019

(87) PCT Pub. No.: WO2018/195570
PCT Pub. Date: Nov. 1, 2018

(65) Prior Publication Data
US 2020/0130623 A1  Apr. 30, 2020

(30) Foreign Application Priority Data

Apr. 24, 2017  (AT) .................................. A 166/2017

(51) Int. Cl.
B60R 21/0136 (2006.01)
B60R 19/48 (2006.01)
(Continued)

(52) U.S. Cl.
CPC ......... B60R 21/0136 (2013.01); B25J 9/1676 (2013.01); B25J 19/063 (2013.01); B60R 19/483 (2013.01)

(58) Field of Classification Search
CPC .. B60R 21/0136; B60R 19/483; B25J 9/1676; B25J 19/063; B25J 13/087; B25J 19/0091
(Continued)

(56) References Cited

U.S. PATENT DOCUMENTS

2004/0149734 A1* 8/2004 Petrenko ................. B60S 1/026
219/538
2008/0185823 A1* 8/2008 Kalliske ................ B60R 21/233
280/729

(Continued)

FOREIGN PATENT DOCUMENTS

DE   102006044071 A1   4/2008
DE   102007062245 A1   6/2009
(Continued)

OTHER PUBLICATIONS

WO2011082979A2.translate (Year: 2011).*
(Continued)

Primary Examiner — B M M Hannan
(74) Attorney, Agent, or Firm — Pillsbury Winthrop Shaw Pittman, LLP (57) ABSTRACT In an apparatus for detecting a collision of a handling device with an obstacle, comprising at least one gas-filled chamber, which is surrounded by a flexible sheath that is deformable by collision with an obstacle and has a flexible supporting structure, wherein the supporting structure forms a damping element, which, together with the sheath, mechanically damps the forces that act in the event a collision, and also comprising a pressure sensor for measuring the gas pressure inside the chamber, wherein the apparatus is able to be attached to the handling device in a manner covering at least a first and a second region of the handling device, the sheath and the supporting structure are formed in one piece with
(Continued)

one another and provide different degrees of damping from one another in the first and the second region.

20 Claims, 5 Drawing Sheets

(51) Int. Cl.
*B25J 19/06* (2006.01)
*B25J 9/16* (2006.01)

(58) Field of Classification Search
USPC .......................................................... 701/45
See application file for complete search history.

(56) References Cited

U.S. PATENT DOCUMENTS

2017/0136633 A1* 5/2017 Zillich ..................... F16P 3/12
2018/0016841 A1* 1/2018 Duck ....................... E06B 9/90

FOREIGN PATENT DOCUMENTS

| DE | 102009040365 A1 | * | 4/2010 | ......... B60R 21/0136 |
| DE | 102015005799 A1 | | 12/2015 | |
| EP | 1810795 A1 | | 7/2007 | |
| JP | 63-39786 A | | 2/1988 | |
| WO | WO-2011082979 A2 | * | 7/2011 | .............. F16F 7/003 |
| WO | 2016/000005 A1 | | 1/2016 | |

OTHER PUBLICATIONS

DE102009040365A1.translate (Year: 2010).*
International Search Report issued in corresponding International Application No. PCT/AT2018/000031 dated Aug. 29, 2018 (6 pgs.).
International Preliminary Report on Patentability dated Oct. 29, 2019 issued in corresponding International Patent Application No. PCT/AT2018/000031 citing Written Opinion of the International Searching Authority dated Aug. 29, 2018 with English translation (16 pgs.).

* cited by examiner

DETECTION OF A COLLISION OF A HANDLING DEVICE WITH AN OBSTACLE

CROSS-REFERENCE TO RELATED APPLICATIONS

This is the U.S. National Stage of PCT/AT2018/000031, filed Apr. 24, 2018, which claims priority to Austrian Patent Application No. A 166/2017 filed Apr. 24, 2017, and all contents of each of these applications are incorporated herein by reference in their entireties.

The invention relates to a device for detecting a collision of a handling device with an obstacle, comprising at least one gas-filled chamber, which is surrounded by a flexible shell being deformable by collision with an obstacle and comprises a flexible support structure, wherein the support structure forms a damping element, which together with the shell mechanically damps the forces acting during a collision, and further comprising a pressure sensor for measuring the gas pressure inside the chamber, wherein the device is attachable to the handling device so as to cover at least a first and a second portion of the handling device.

The invention further relates to a method for producing such a device.

The invention also relates to a handling device comprising a collision detection device of the above mentioned kind that covers at least a first and a second region of the same, wherein the handling device has an emergency shutdown, which is activated in response to the signals of the pressure sensor.

A device of the type mentioned in the introduction is described, for example, in WO 2016/000005 A1 and serves as a tactile safety sensor for protecting persons and stationary or autonomously moving obstacles against stationary or autonomously moving handling devices, in particular industrial robots, e.g. manufacturing, transport, inspection or service robots and their manipulators. For collision detection, the safety sensor or a plurality of such safety sensors is attached to the handling device and/or to its manipulators. The safety sensor described in WO 2016/000005 A1 essentially comprises an airtight shell which encloses a gas- or air-filled chamber, and an internal barometric pressure sensor. The shape of the shell is held by a resilient support structure, with the support structure and the shell together forming the body of the sensor. The support structure ensures dimensional stability and mechanical damping of the forces acting during a collision. Touching the sensor leads to a deformation of the shell and thus to a compression of the chamber together with the support structure, which in turn leads to a measurable increase in pressure inside the shell. A pressure increase above a certain threshold leads to the stop of the handling device to be secured, on the surface of which the sensor attached.

In the safety sensor described in WO 2016/000005 A1, each sensor has its own pressure-increasing device with which a predetermined internal pressure can be set and held in the sensor chamber. The overpressure inside the sensor chamber serves to test the tightness of the shell. If the shell becomes leaky due to damage and thus the safety sensor can no longer function properly, this would be indicated by the overpressure escaping, resulting in a corresponding emergency signal from the safety sensor. Furthermore, the damping characteristic of a safety sensor, in addition to the choice of material of the resilient support structure, can also be adjusted to a certain extent by the level of the internal pressure.

However, it has been found that the homogeneous support structure provided in the prior art together with an adjustable internal pressure does not always ensure a sufficient adjustment of the damping property in the entire area of the device. The present invention therefore aims to better match the response of the sensor to the safety requirements of the work process to be secured, and to simplify the manufacturing process of the sensor.

To achieve this object, the invention, in a device of the type mentioned initially, essentially consists in that the shell and the support structure are integrally formed with each other and provide a mutually different degree of damping in the first and in the second area. By forming the shell and the support structure integrally with each other, the shell and the support structure can be formed in a simple manner as a single body, wherein in particular spatial structures can be created for the support structure that are novel and adapted to the respective requirements. According to a preferred embodiment of the invention, the one-piece design is achieved in that the shell and the support structure are manufactured by a generative manufacturing process, in particular in layers, such as, e.g., by selective laser sintering. Generative manufacturing processes are also referred to as 3D printing processes and allow the production of support structures h a high geometric complexity.

The use of generative manufacturing methods makes it possible in a simple manner to form the shell and the support structure such that a mutually different degree of damping is provided in the first and in the second region. In particular, the construction and the rigidity of the support structure can be locally selected such that the respectively required mechanical damping is achieved on each section of the surface of the handling device. The required damping results from the safety requirements of the work process to be secured or of t handling device to be secured, such as e.g. the travel speed and the maximum permitted contact force.

It is preferably provided here that the support structure and/or the shell is locally changed such that in the first and in the second region of a different degree of damping is provided. The variation of the degree of damping according to the invention can be effected either by local variation of the design of the shell or by local variation of the design of the support structure or both, the design of the shell and the design of the support structure may be varied locally.

The variation of the degree of damping of the sensor body consisting of the support structure and the shell may hereby preferably take place within one and the same sensor chamber. Alternatively, a plurality of separate chambers are provided, i.e. a plurality of sensor bodies, each consisting of a support structure and a shell, that provide mutually different degrees of damping. The design is advantageously such that the device comprises at least a first gas-filled chamber and a second gas-filled chamber whose shell and support structure are each formed integrally with each other, wherein the shell and the support structure of the first chamber provide a different degree of damping than the shell and support structure of the second chamber.

The support structure is preferably constructed such that it interconnects opposite regions of the shell, in particular the region of the shell arranged at the top of the device and the region of the shell arranged at the bottom of the device. The support structure is designed in this case so that it passes through the chamber. Herein, the upper side of the device designates the side facing away from the handling device to be secured, and the underside designates the side of the device facing the handling device to be secured. Furthermore, "inside" hereinafter refers to all parts within the airtight shell and "outside" refer to all parts outside the airtight shell.

Preferably, the support structure has a plurality of support) elements. The support elements can form within the chamber, for example, a space grid, which is preferably constructed of cubes, tetrahedrons or truncated octahedrons or formed as a honeycomb grid.

Alternatively or additionally, the support elements may be formed by webs and/or rods that cross the chamber.

Furthermore, an embodiment is possible in which the support structure comprises a tree structure that branches from the bottom towards the top of the device. In this shell, the tree structure comprises thick rods, for example, which branch out to the upper side of the sensor body and become finer. This allows a configuration in which the proportion of the cavity being free from the support structure is relatively large in the region of the underside of the device, whereby a weight saving is achieved, while in the region of the upper side a well-distributed support effect is achieved by the branching finer rods.

The adjustment of the degree of damping is achieved in a particularly simple manner in that the number of support elements per unit volume of the chamber is selected to be greater in the first region than in the second region. The higher the number of support elements per unit volume of the chamber is selected, the stiffer or stronger the support structure. The smaller the number of support elements per unit volume of the chamber is selected, the softer or more flexible the support structure is. By employing a generative manufacturing process, the spatial density of the support members can be easily varied locally within one and the same chamber, i.e. within one and the same body consisting of shell and support structure.

The support elements of the support structure may preferably have rounded connections to each other and/or to the shell in order to ensure a better mechanical stability. For a rounded connection, the individual support elements merge into one another via a radius.

The local variation of the degree of damping can alternatively or additionally also be effected by changing the physical material properties of the support structure, in particular by varying the rigidity of the material. Preferably, it is provided herein that the support structure is made of stiffer material in the first region than in the second region.

The local variation of the degree of damping can alternatively or additionally also be achieved by a corresponding change in the thickness of the support structure. In particular, it can be provided that the support structure in the first region has a greater thickness than in the second region. Herein, the thickness is understood to mean the distance between the upper side and the underside of the sensor body consisting of support structure and shell.

In an embodiment in which the variation of the degree of dampening is effected by a local change of the shell, it may be provided that the thickness of the shell and/or the rigidity of the shell at the top of the device is selected to be greater in the first region than in the second region. Herein, the support structure can either be designed with homogeneous damping properties or an additional local influencing of the degree of damping can be achieved by and additional local variation of the support structure. In the latter case, it can be provided that the degree of damping of the shell at the top of the device is selected to be greater in the first region than in the second region and that the degree of damping of the support structure is selected to be greater in the second region than in the first region.

In particular, a thick or solid shell, possibly in combination with a soft support structure, when in contact with an obstacle leads to a rather large-scale impression of the sensor body. Conversely, a thin or soft shell, possibly in combination with a solid support structure, leads to a rather local impression of the sensor body.

A further preferred embodiment provides that the thickness of the shell and/or the rigidity of the shell at the top of the device is chosen to be lower in an edge region of the chamber than in a central region. Herein, the edge region can be a curved region. The thickness of the shell and/or the rigidity of the shell at the top of the device can be chosen to be lower in a curved portion of the shell than in a flat region of the shell. This ensures a consistently high sensitivity of the sensor to the edge region or in a curved region of the upper side.

According to a further preferred embodiment it can be provided that the support structure comprises a material reinforcement, which is arranged on the inside of the shell on the upper side of the device, wherein the material reinforcement preferably has a honeycomb-like pattern. For example, the shell and support structure may be designed so that the support structure may consist of few support elements, e.g. webs or bars, and the shell is reinforced by means of a honeycomb-like structure. This allows a high void content, whereby a weight saving achieved, while maintaining high rigidity.

As is known per se, it is preferably provided that each chamber has its own pressure-increasing device, preferably a particularly piezoelectrically-driven pump or a blower. The pressure-increasing device is preferably arranged so that it can convey ambient air into the respective chamber. Preferably, the pressure sensor cooperates with the pressure increasing device via a control circuit to establish and maintain a predetermined gas pressure in the chamber.

The invention further provides a handling device in which at least one collision detection device according to the invention covers at least a first and a second region of the handling device, wherein the handling device has an emergency shutdown, which can be activated in response to the signals of the pressure sensor.

The handling device can be designed as an industrial robot, in particular as a production, transport, inspections or service robot.

The invention will be explained in more detail with reference to embodiments schematically shown in the drawing. Herein.

Figure 1:
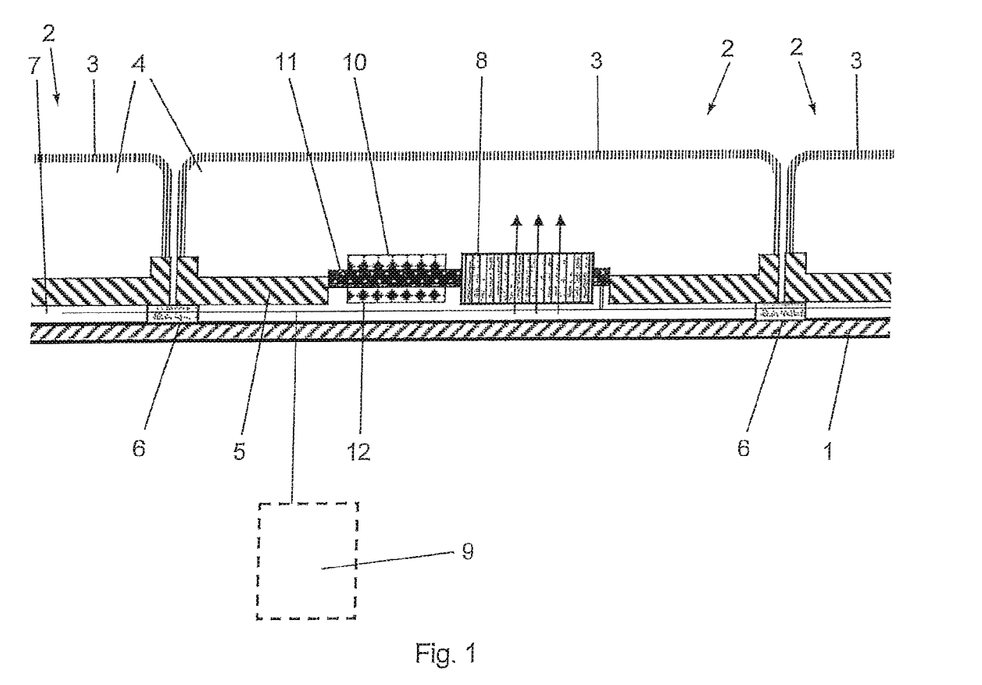
FIG. 1 shows a cross section of a collision detection device according to the prior art.

In FIG. 1, there is shown a collision detection device mounted on the surface 1 of a handling device. The device comprises a plurality of sensor bodies 2, each having an air-filled chamber 4 surrounded by a shell 3. The shell 3 is attached to a plastic base shell 5 and forms an airtight closure or the chamber 4 with the same. The base shell 5 is attached to the surface 1 of the handling device with the interposition of spacers 6, e.g. attached by means of an adhesive connection. The clearance achieved by the spacers 6 creates an air inlet and cable passage channel 7 between the underside of the sensor body 2 and the surface 1.

The pressure prevailing in the chamber 4 is adjusted by means of a pressure-increasing device 8, which draws in ambient air from the channel 7 and thereby generates a pressure in the interior of the sensor body 2 that is adjusted by the control device 9. The pressure-increasing device 8 is received in a recess of the base shell 5. Also received in the recess of the base shell 5 is a pressure sensor 10, which measures the air pressure prevailing in the chamber 4. The internal pressure sensor 10 is preferably fastened on a carrier plate 11 designed as a printed circuit board, which on the outside can also carry a reference pressure sensor 12. With regard to the operation of the collision detection device, reference is made to WO 2016/000005 A1.

Figure 2:
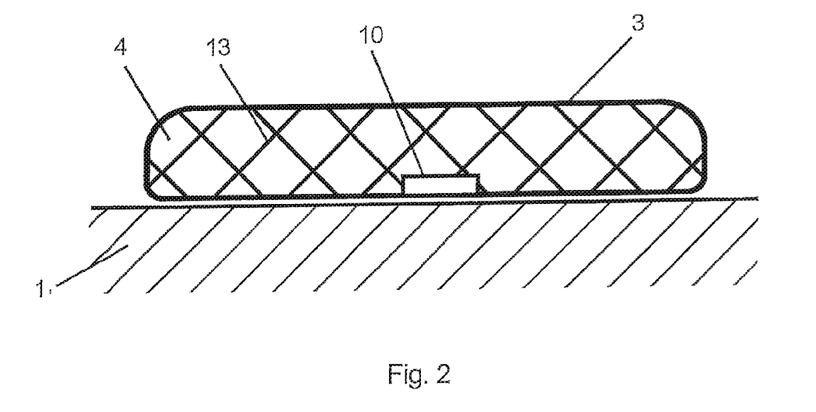
FIG. 2 shows a collision detection device according to the invention.

The embodiment according to the invention, which is shown schematically is FIG. 2, works analogously to the embodiment according to FIG. 1, but the sensor body 2 has a support structure 13 arranged in the chamber 4, which is indicated in FIG. 2 only by cross-hatching. Deviating from FIG. 1, the shell 3 is not fastened to a base shell, but s rounds the chamber 4 in its entirety. Furthermore, the shell and the support structure 13 are formed integrally with each other, in particular by means of a generative, layered manufacturing process. The printed circuit board 11 together with the pressure sensors 10 and possibly 12 can be constructed as in the embodiment according to FIG. 1. The same applies to the pressure-increasing device, which is not shown in FIG. 2 for the sake of clarity.

Figure 3:
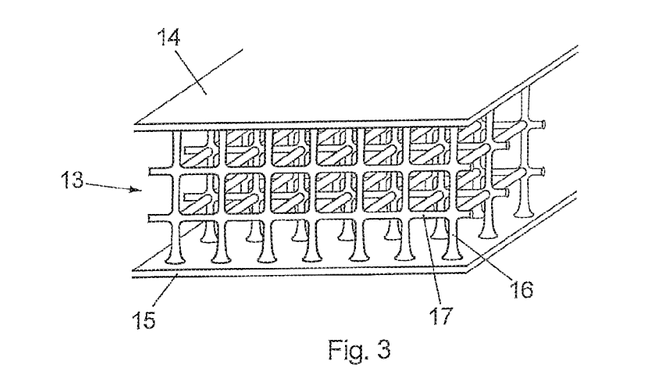
FIG. 3 shows a detailed view of a first embodiment of the support structure.

The following figures show various embodiments of the support structure. FIG. 3 shows a support structure 13, which connects the shell region 14 arranged on the upper side of the sensor body to the shell region 15 arranged on the lower side of the sensor body. FIG. 3 shows only a section of the support structure 13, but the support structure 13 also connects the two lateral areas (not shown) of the shell 3 with each other. The shell 3 and the support structure 13 are made of a flexible plastic material, preferably of the same material, and have been built in one piece by means of a generative manufacturing process, in particular by selective laser sintering (SLS). The support structure 13 consists in the present case of a plurality of bars mutually crossing at right angles, wherein a first group of parallel bars 16 connects the top to the bottom and a second group of parallel bars 17 extends from one side to the other side, so that a cubic space grid is provided.

Figure 4:
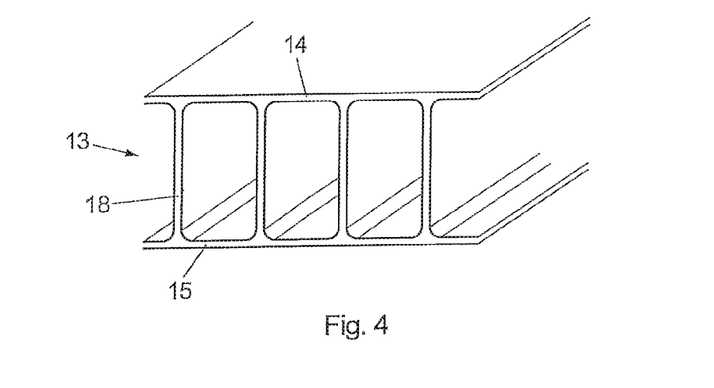
FIG. 4 shows a detailed view of a second embodiment of the support structure.

FIG. 4 shows a support structure 13, which connects the shell region 14, which is arranged on the upper side of the sensor body, to the shell region 15, which is arranged on the lower side of the sensor body and consists of parallel webs 18.

Figure 5:
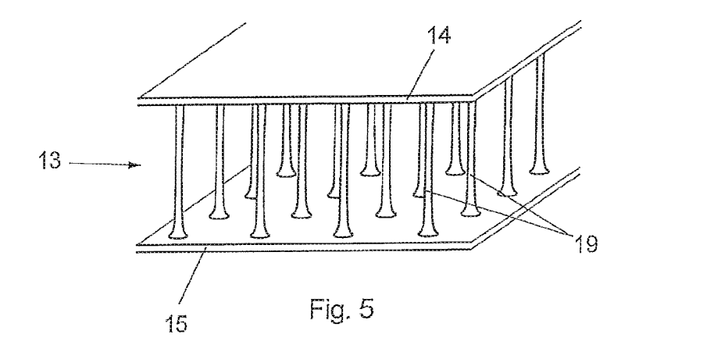
FIG. 5 shows a detailed view of a third embodiment of the support structure.

FIG. 5 shows a support structure 13, which connects the shell region 14 arranged on the upper side of the sensor body to the shell region 15 arranged on the lower side of the sensor body and consists of parallel bars 19.

Figure 6:
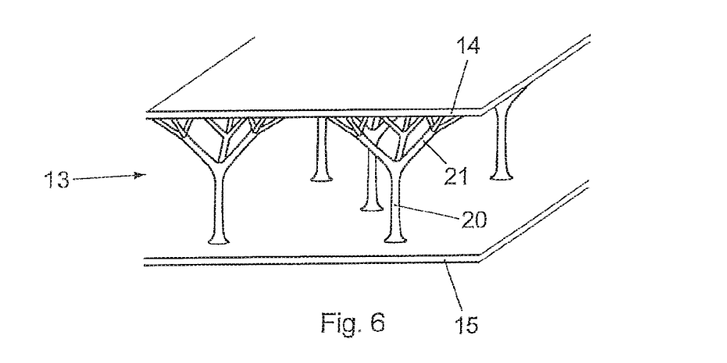
FIG. 6 shows a detailed view of a fourth embodiment of the support structure.

FIG. 6 shows a support structure 13, which connects the shell region 14 arranged at the upper side of the sensor body to the shell region 15 arranged at the lower side of the sensor body and consists of a tree structure branching from the lower side to the upper side, wherein a trunk portion 20 branches into branches 21.

Figure 7:
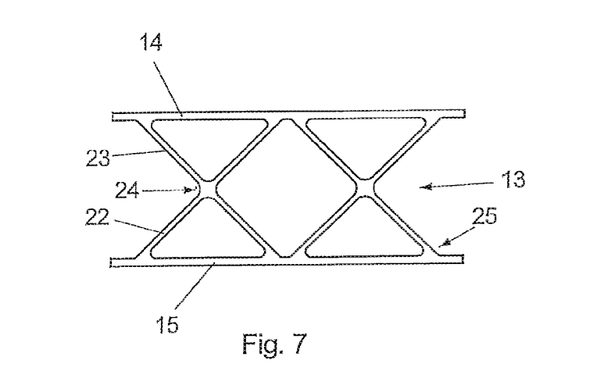
FIG. 7 shows a detailed view of a fifth embodiment of the support structure.

FIG. 7 shows an embodiment, in which the support structure 13 is designed as X-shaped webs 22 and 23, wherein a radius formed in the crossing region 24 and in the connecting region 25 of the webs 22 and 23 with the shell 3 and the shell portions 14 and 15.

In the embodiments according to FIGS. 3 to 7, the degree of dampening provided by the support structure can be varied locally, for example by varying the number of support elements (webs, rods, tree structure) per unit volume, so that the resulting structure is either denser or less dense. The local variation of the degree of damping can also be made by changing the material thickness or the material stiffness of the respective support elements.

Figure 8:
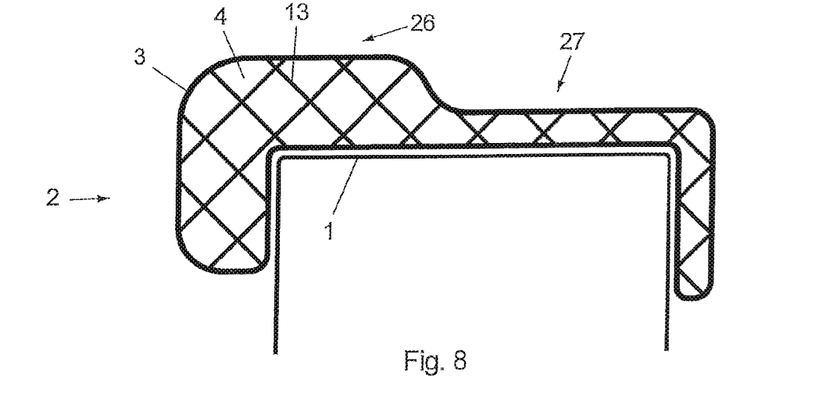
FIG. 8 shows a detailed view of a sixth embodiment of the support structure.

The local variation of the degree of dampening can also be achieved by changing the thickness measured between top and bottom, as shown for example in FIG. 8. FIG. 8 shows a region of a handling device whose surface 1 is covered by a sensor body 2. The support structure 13 is made thicker in a first region 26 than in a second region 27.

Figure 9A:
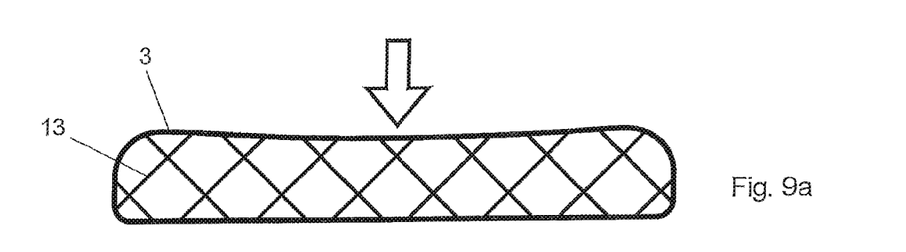
FIGS. 9a and 9b show a detailed view of a seventh embodiment and eight embodiment of the support structure.
Figure 9B:
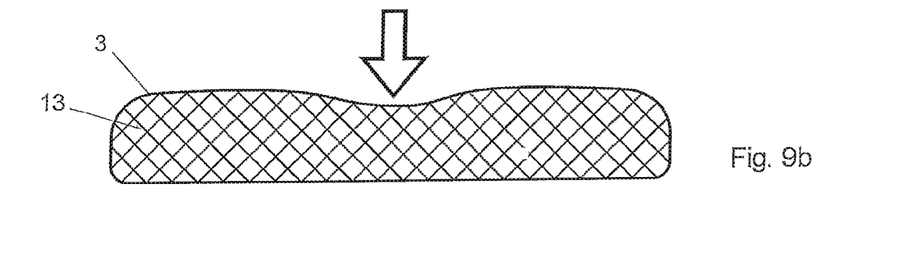

FIG. 9 shows an embodiment, in which the wall thickness and/or rigidity of the shell 3 is varied. In particular, a thick/solid shell 3, possibly in combination with a soft support structure 13, when touched, results a rather large-scale depression of the sensor body (FIG. 9a). Conversely, a thin/soft shell possibly in combination with a rigid support structure 13, leads to a more local impression of the sensor (FIG. 9b).

Figure 10:
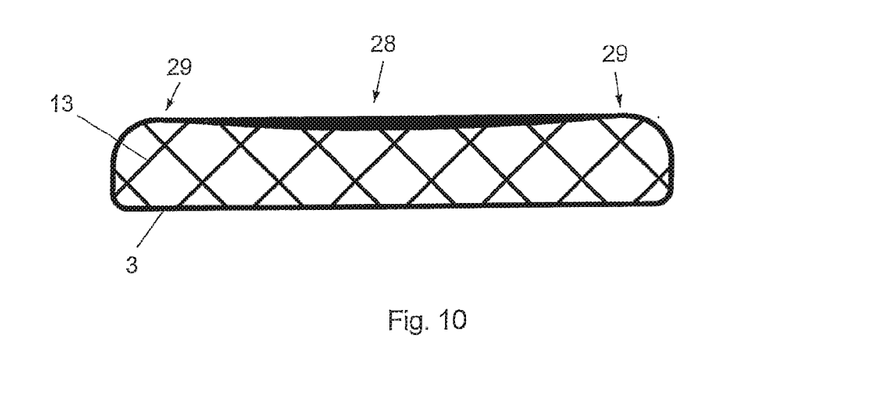
FIG. 10 is a detailed view of a ninth embodiment of the support structure.

Furthermore, as shown in FIG. 10, the wall thickness of the shell 3 may be larger in the center 28 of the sensor surface than on the edge 29 of the sensor surface.

Figure 11:
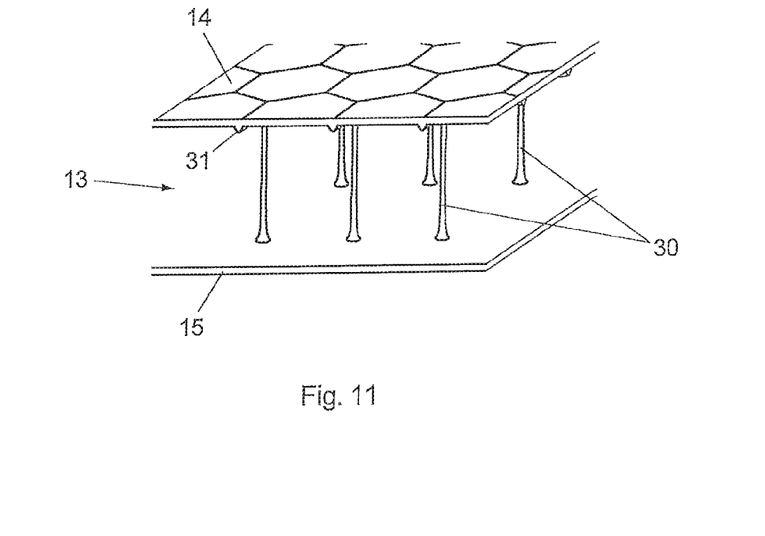
FIG. 11 is a detail view of a tenth embodiment of the support structure.

In the embodiment of FIG. 11, the support structure comprises a smaller number of support members 30, e.g. webs or bars, which connect the shell region 14 arranged on the upper side of the sensor body to the shell region 15 arranged on the lower side of the sensor body, an additional supporting effect being achieved by a reinforcing structure 31 integrally formed on the upper-side shell region 14 and forming a honeycomb pattern. This allows a large void content, and thus a weight savings, while maintaining high rigidity.

Figure 12:
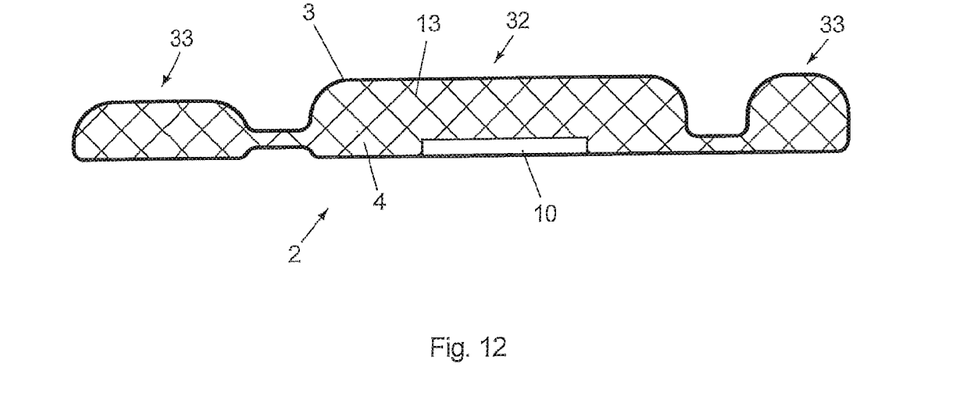
FIG. 12 is a detail view of an eleventh embodiment of the support structure.

As shown in FIG. 12, the sensor body 2 may have a multiple thickness variation, wherein the chamber 4 comprises a central portion 32 and two lateral portions 33 which are interconnected by tubular connections. Here, only the central area 32 includes the pressure sensor 10, including electronics.

The invention claimed is:

1. A collision detection device for detecting a collision of a handling device with an obstacle, comprising at least one gas-filled chamber, which is surrounded by a flexible shell being deformable by collision with an obstacle and comprises a flexible support structure, wherein the flexible support structure forms a damping element, which together with the flexible shell mechanically damps forces acting during a collision, and further comprising a pressure sensor for measuring gas pressure inside the at least one gas-filled chamber, wherein the collision detection device is attachable to the handling device so as to cover at least a first and a second portion of the handling device, wherein the flexible shell and the flexible support structure are integrally formed with each other and provide a mutually different degree of damping in a first region and in a second region, wherein the flexible shell and the flexible support structure are manufactured by a generative manufacturing process in layers.

2. The collision detection device according to claim 1, wherein the flexible support structure and/or the flexible shell is locally changed such that in the first region and in the second region of a different degree of damping is provided.

3. The collision detection device according to claim 1, wherein the collision detection device comprises at least a first gas-filled chamber and a second gas-filled chamber whose flexible shells and flexible support structures are each formed integrally with each other, wherein the flexible shell and the flexible support structure of the first gas-filled chamber provide a different degree of damping than the flexible shell and flexible support structure of the second gas-filled chamber.

4. The collision detection device according to claim 1, wherein the flexible support structure interconnects opposite regions of the flexible shell, the opposite regions of the flexible shell being arranged at a top of the collision detection device and at a bottom of the collision detection device.

5. The collision detection device according to claim 1, wherein the flexible support structure comprises a plurality of support elements.

6. The collision detection device according to claim 5, wherein the support elements (a) form a space grid constructed of cubes, tetrahedrons or truncated octahedrons, or (b) are formed as a honeycomb grid.

7. The collision detection device according to claim 5, wherein the support elements are formed by webs and/or bars that cross the at least one gas-filled chamber.

8. The collision detection device according to claim 5, wherein a number of support elements per unit volume of the at least one gas-filled chamber is selected to be greater in the first region than in the second region.

9. The collision detection device according to claim 1, wherein the flexible support structure comprises a tree structure that branches from a bottom towards a top of the collision detection device.

10. The collision detection device according to claim 1, wherein the flexible support structure is made of stiffer material in the first region than in the second region.

11. The collision detection device according to claim 1, wherein the flexible support structure has a greater thickness in the first region than in the second region.

12. The collision detection device according to claim 1, wherein a thickness of the flexible shell and/or a rigidity of the flexible shell at a top of the collision detection device is selected to be greater in the first region than in the second region.

13. The collision detection device according to claim 1, wherein the degree of damping of the flexible shell at a top of the collision detection device is selected to be greater in the first region than in the second region and that the degree of damping of the flexible support structure is selected to be greater in the second region than in the first region.

14. The collision detection device according to claim 1, wherein a thickness of the flexible shell and/or a rigidity of the flexible shell at the top of the collision detection device is chosen to be lower in an edge region of the at least one gas-filled chamber than in a central region.

15. The collision detection device according to claim 1, wherein a thickness of the flexible shell and/or a rigidity of the flexible shell at a top of the collision detection device is selected to be lower in a curved portion of the flexible shell than in a flat region of the flexible shell.

16. The collision detection device according to claim 1, wherein the flexible support structure comprises a material reinforcement, which is arranged on an inside of the flexible shell on an upper side of the collision detection device, wherein the material reinforcement has a honeycomb-like pattern.

17. The collision detection device according to claim 1, wherein the at least one gas-filled chamber has its own pressure-increasing device in a form of a particularly piezo-electrically driven pump or a blower.

18. The collision detection device according to claim 17, wherein the pressure sensor cooperates with the pressure increasing device via a control circuit to establish and maintain a predetermined gas pressure in the at least one gas-filled chamber.

19. Handling device comprising the collision detection device according to claim 1, that covers at least the first region and the second region thereof, wherein the handling device has an emergency shutdown, which is activated in response to signals of the pressure sensor.

20. Method for producing the collision detection device according to claim 1, wherein the flexible shell and the flexible support structure are made integral with one another by a generative manufacturing process in layers.

* * * * *